Dec. 7, 1965    R. A. FERRARA    3,222,107
RETRACTABLE SEAT BELT ASSEMBLY
Filed Oct. 16, 1962    3 Sheets-Sheet 1

INVENTOR.
Rudolph A. Ferrara
BY
J. L. Carpenter
ATTORNEY

Dec. 7, 1965  R. A. FERRARA  3,222,107
RETRACTABLE SEAT BELT ASSEMBLY
Filed Oct. 16, 1962  3 Sheets-Sheet 2
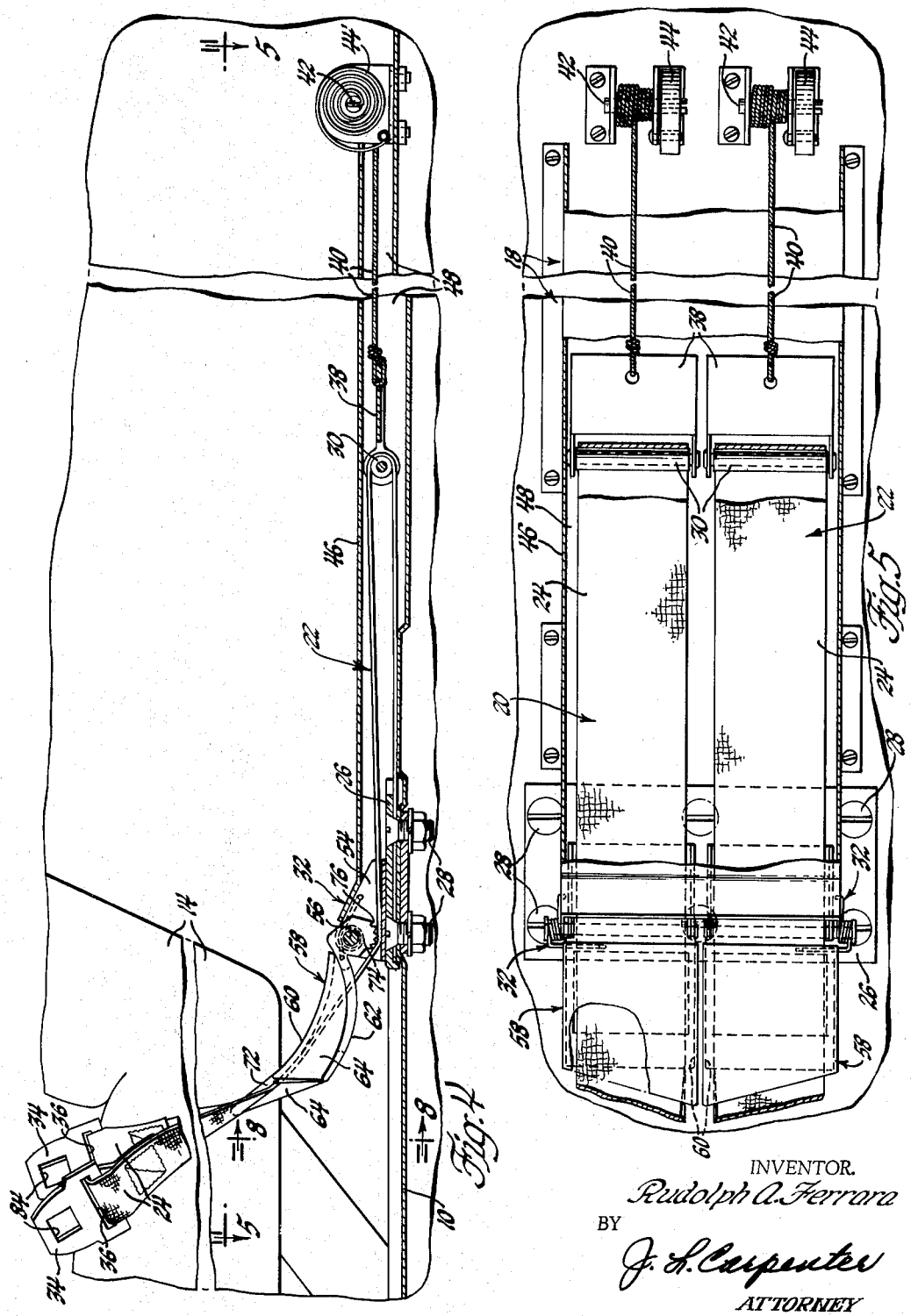
INVENTOR.
Rudolph A. Ferrara
BY
J. L. Carpenter
ATTORNEY INVENTOR.
Rudolph A. Ferrara
BY
J. L. Carpenter
ATTORNEY United States Patent Office 3,222,107
Patented Dec. 7, 1965

3,222,107
RETRACTABLE SEAT BELT ASSEMBLY
Rudolph A. Ferrara, Warren, Mich., assignor to General Motors Corporation, Detroit, Mich., a corporation of Delaware
Filed Oct. 16, 1962, Ser. No. 230,847
1 Claim. (Cl. 297—388)

This invention relates to a retractable seat belt assembly for vehicles and more particularly to an assembly which retracts and stores the seat belt when it is not in use and automatically locks the adjustable end when the seat belt is placed in operating position.

Historically, seat belts were used in aircraft but more recently they are becoming more extensively used in automobiles to protect passengers and operators from injury during accidents or sudden stops of the vehicle. The commercially available seat belts are generally of two piece construction having one end of each piece anchored to the floor or to the seat and providing a buckle to join the free ends. Due to the various sizes of the potential users, seat belts, of necessity, must be adjustable. For ease of adjustment most seat belts provide for the adjustment to be accomplished at the buckle end with the common result of having an undesirable loose end when the seat belt is in place. Another common fault of the present seat belts is having the unattached seat belts lying loose on the seat or floor when not in use.

An object of this invention is to provide a novel and improved retractable seat belt assembly in which the seat belt is conveniently stored when not in use.

A further object of this invention is to provide a seat belt which automatically adjusts as it is placed in operating position to better accommodate various occupants of the seat.

A further object of this invention is to provide a positive locking means to secure the adjustable end of the seat belt when the seat belt is in operating position.

These and other objects, advantages and features of the invention will become more fully apparent as reference is had to the accompanying specification and drawings wherein:

FIGURE 4 is a view taken substantially along line 4—4 of FIGURE 1 illustrating the seat belt, seat belt lock, tunnel area and retracting means.

FIGURE 5 is a view taken in the direction of the arrows 5—5 of FIGURE 4, with sections cut away to show the retracting means.

Figure 1:
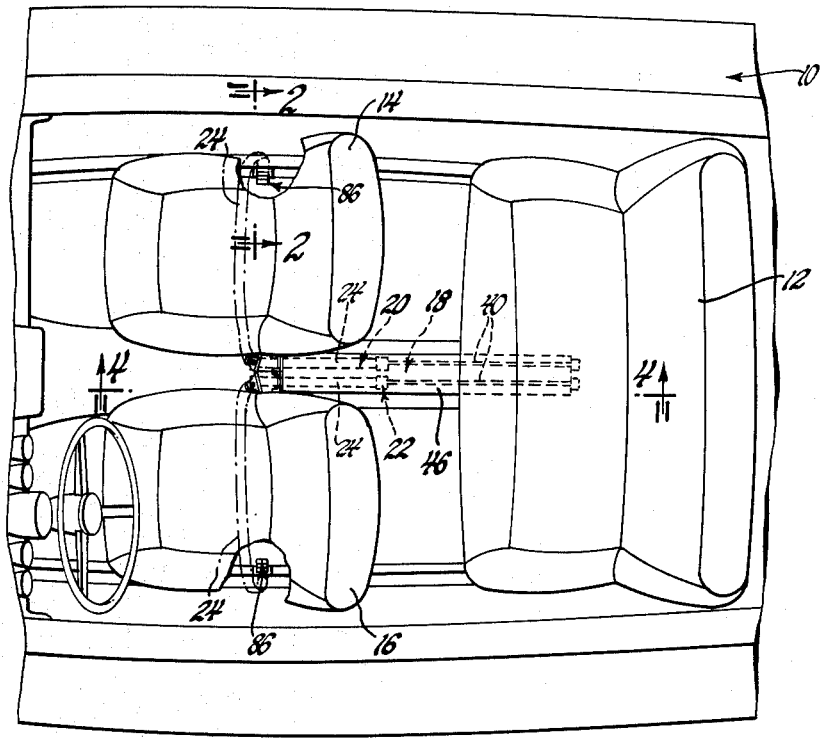
FIGURE 1 is a top view of a section of a vehicle body showing bucket seats with the present invention mounted in association therewith.
Figure 2:
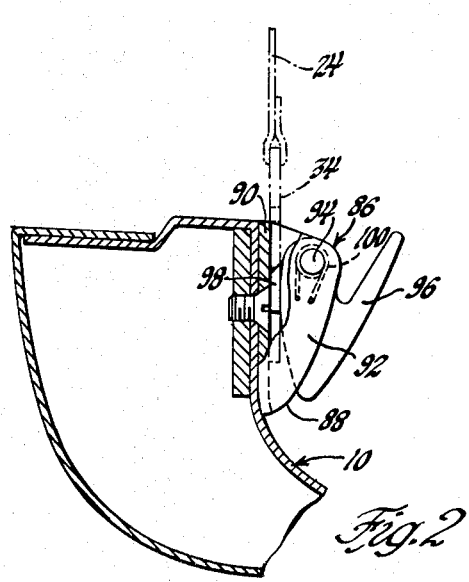
FIGURE 2 is a view taken substantially along line 2—2 of FIGURE 1, with sections cut away, showing the anchor lock in locked position and the anchor plate is shown in phantom lines.
Figure 3:
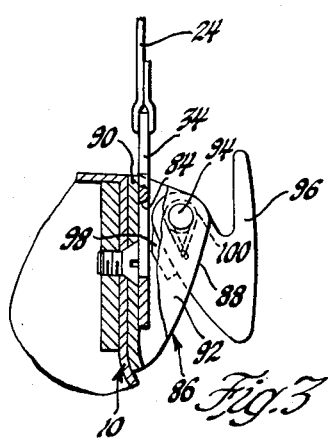
FIGURE 3 is a portion of FIGURE 2 showing the anchor lock in the unlocked position.
Figure 6:
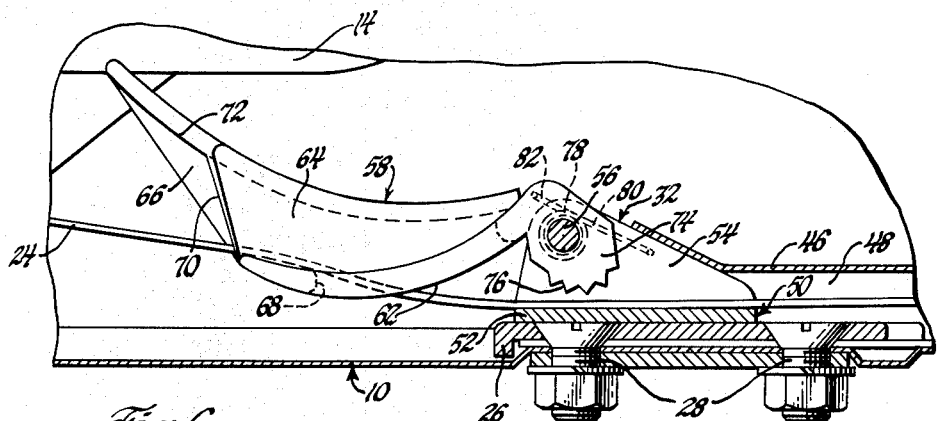
FIGURE 6 is a sectional side view of the seat belt lock in the unlocked position in which position the seat belt may be withdrawn or retracted.
Figure 7:
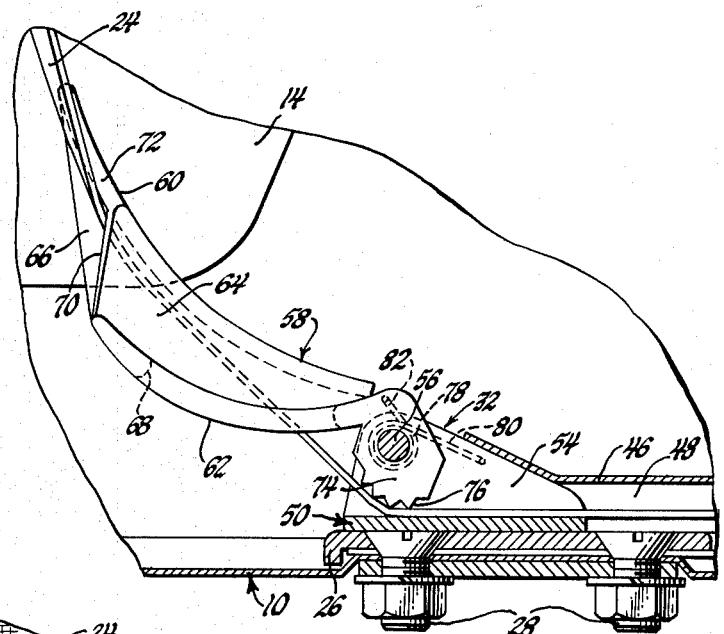
FIGURE 7 is a sectional side view of the seat belt lock in locked position with the seat belt in operating position.
Figure 8:
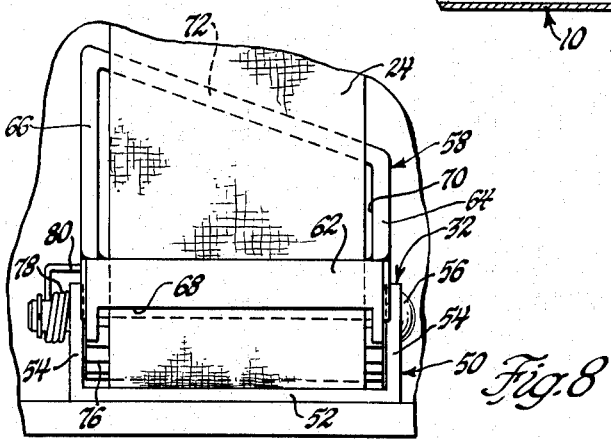
FIGURE 8 is a view taken in the direction of the arrows 8—8 of FIGURE 4 showing the seat belt lock in locked position and the seat belt in operating position.

Referring to FIGURE 1, mounted in a vehicle body 10 is a conventional rear seat 12 and individual or bucket front seats 14, 16. A seat belt assembly 18 is shown mounted in the tunnel area between the bucket seats 14, 16. The seat belt assembly 18 provides two seat belt units 20, 22 so that each bucket seat is provided with a seat belt unit.

Since each seat belt unit is identical to the other except for being right and left units, similar reference numerals will be used and the passenger's unit 20 will be described.

Referring to FIGURES 4 and 5, one end of the seat belt 24 is secured to the vehicle body 10 by a plate 26 and bolts 28 or other suitable means. From plate 26, the seat belt is threaded about a roller 30 and through the seat belt lock 32. The free end of the seat belt 24 is attached to an anchor plate 34 by looping the belt 24 through a slot 36 in the anchor plate 34 and sewing or suitably securing the end of the seat belt 24 to the portion of the belt leading into the slot 36.

One end of a yoke 38 rotatably supports roller 30 and the other end of yoke 38 is secured to one end of a cable 40. The other end of cable 40 is connected to a roller 42 which is spring biased by a clock spring 44 to wind the cable 40 about the roller 42. The seat belt retracting means consists of the roller 30, yoke 38, cable 40, roller 42 and biasing spring 44. A cover 46 protects the seat belt 24, roller 30, yoke 38 and cable 40 from passengers or objects placed on the floor and also provides a storage area 48 for the seat belt 24 and cable 40 to move within.

Referring now to FIGURES 4 through 8, the seat belt lock 32 consists of a U shaped frame 50 having a base portion 52 with two supporting arms 54. A shaft 56 parallel to the base 52 is supported at each end by the support arms 54. A combination locking cam, belt guide and handle 58 is pivotally mounted upon shaft 56. The combination belt guide and handle consists of a curved upper surface 60 and a curved lower surface 62 connected by side plates 64, 66. There is a slot 68 in the lower surface 62 through which the belt 24 is threaded so that it passes between the upper curved surface 60 and the lower curved surface 62 and between the side plates 64, 66 and out through the opening 70 in the front of the handle. The exit edge 72 of the upper curved surface 60 is formed on the bias to the parallel side edges of the upper curved plate 60. The bias along this edge is provided to help guide the belt into a flattened position over the user's lap.

A locking cam 74 is integrally formed with the rear of the handle and positioned to rotate about shaft 56. Teeth 76 are formed along the outer surface of cam 74. Cam portion 74 is positioned on shaft 56 so that clockwise rotation of handle 58 will move the teeth 76 closer to the base plate 52 of the frame 50. The seat belt 24 is threaded between the cam 74 and the base portion 52 so that rotation of the cam will bind the belt 24 and act as a lock, restricting movement of the belt.

A torsion spring 78 is positioned about shaft 56 outside frame 50 having one arm 80 anchored in frame 50 and the other arm 82 anchored in handle 58 to bias the handle 58 in a clockwise or locking direction about shaft 56.

Referring now to FIGURES 1 through 4, the anchor plate 34 has a rectangular aperture 84 adapted to cooperate with an anchor lock 86 which is secured to the vehicle body 10 by bolts or other suitable means.

The anchor lock 86 consists of a U shaped frame 88 having a base portion 90 with two parallel arms 92 extending therefrom. A shaft 94 extends between the arms 92 and rotationally supports the anchor lock handle 96. The anchor lock handle 96 is formed with a lock detent 98 adapted to cooperate with aperture 84 in securing the anchor plate 34 in the anchor lock 86. The anchor lock handle 96 is spring biased into locking engagement by a torsion spring 100 mounted on shaft 94 having one arm anchored in the handle 96 and the other in the frame 86.

To use the seat belt, the seat occupant grasps the belt at the latch plate end and pulls the seat belt straight forward. By pulling the seat belt forward the latch handle is moved in a counterclockwise direction thus positively releasing the cam lock and the belt is free to move. When sufficient belt has been withdrawn from the storage assembly the seat belt is moved across the user's body and the latch plate is placed and secured in the anchor lock. When the free end of the belt has been secured in the anchor lock the retracting means takes up the excess belt that has been withdrawn from the storage unit. As the excess belt is pulled back into the storage unit by the cable and roller means the handle of the seat belt lock is rotated in a clockwise direction. This clockwise rotation of the handle moves the teeth on the cam into engagement with the seat belt thus securing the adjustable end.

When the seat belt is released from the anchor lock, it is moved from about the body of the user and dropped to the floor by the seat. This movement of the seat belt moves the handle of the seat belt lock in a counterclockwise direction unlocking the teeth of the cam and allows the spring biased cable to retract the seat belt into the storage unit.

While but one embodiment of this invention has been shown and described, it will be evident that numerous changes and modifications may be made therein. It is therefore to be understood that it is not intended to limit the invention to the embodiments shown but only by the scope of the claims which follow.

I claim:

In a vehicle body, a seat belt assembly comprising a housing adjacent one side of a vehicle seat, a seat belt secured at one end within said housing and having a free end portion movable from a stored position within the housing across the seat and secured to the vehicle body adjacent the side of the seat opposite from said housing, means for retracting the seat belt from said secured position, and belt locking means including a belt guide member having an elongated lateral upper surface, said member pivotally mounted adjacent the open end of the housing member and receiving said belt in one end thereof and said surface being formed on a bias at the other end of said member whereby said belt engages said biased surface to be guided into a flat operable position, said belt locking means being swingable by angular movement of the guided belt portion between a normal operating position automatically locking the belt and a second position releasing the free end of the belt.

References Cited by the Examiner
UNITED STATES PATENTS

| | | | |
|---|---|---|---|
| 702,165 | 6/1902 | Tryon | 24—134 |
| 2,071,903 | 2/1937 | Shively | 297—386 |
| 2,488,858 | 11/1949 | Franz | 297—388 |
| 2,622,293 | 12/1952 | Wermlinger | 24—170 |
| 2,725,097 | 11/1955 | Thoreson | 297—388 |
| 2,939,519 | 6/1960 | McCall | 297—388 |
| 2,947,353 | 8/1960 | Wimmersperg | 297—388 |
| 2,971,730 | 2/1961 | Martin | 244—122 |

FRANK B. SHERRY, *Primary Examiner.*